455-618    AU 233    EX
FIP8106    XR    2,153,490
April 4, 1939.    G. WIKKENHAUSER ET AL    2,153,490
LIGHT MODULATING DEVICE
Filed Nov. 18, 1938
*amplitude modulation*
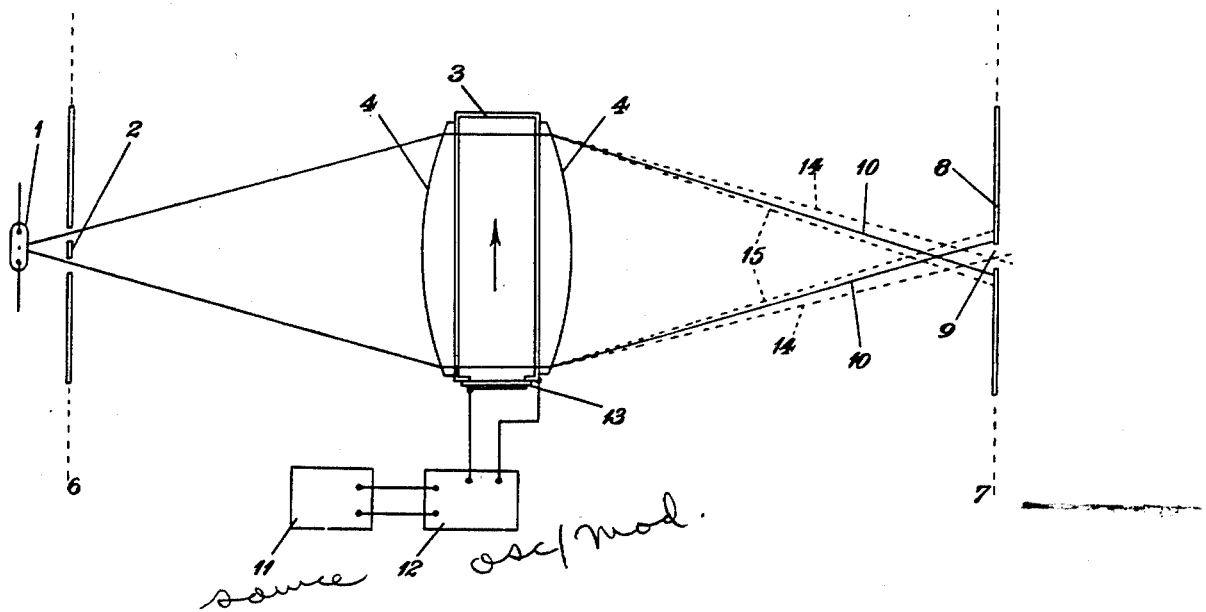
Inventors-
Gustav Wikkenhauser.
Joshua Sieger.

Patented Apr. 4, 1939

2,153,490

UNITED STATES PATENT OFFICE 2,153,490

LIGHT MODULATING DEVICE

Gustav Wikkenhauser and Joshua Sieger, Kensington, London, England

Application November 13, 1938, Serial No. 241,234
In Great Britain November 15, 1937

1 Claim. (Cl. 88—61)

The present invention relates to supersonic wave light modulating devices in which the diffraction effects produced by a moving train of compressional waves of supersonic frequency in a transparent body traversed by a light beam are utilised.

In such devices it is customary to employ as the light source an illuminated slit, and to focus an image of this slit on to the means employed for separating the light which passes through the supersonic wave cell without deviation from the light which is deviated by the diffraction grating action of the waves in the medium contained in the cell. The undeviated light forms a single image of the slit, usually referred to as the central image, and the deviated light forms a plurality of further images of the slits usually referred to as the side images or fringes. These fringes lie on either side of the central image, and as the amplitude of the supersonic waves increases, their intensity also increases at the expense of the intensity of the central image. If it is desired to utilise as the controlled light beam the undeviated portion, the separating means comprise a screen with a slit, and the central image falls on this slit whilst the fringes fall on the screen, so that the undeviated light passes through the slit and the deviated light is intercepted by the screen. If it is desired to utilise the deviated light as the controlled light, then the separating means comprises a bar having such a thickness that the central image coincides with the bar and the fringes lie on either side of it. The undeviated light is thus intercepted and the deviated light is allowed to pass on either side of the bar.

The present invention is concerned with the latter case, since for most purposes it is found preferable to use the deviated light as the controlled light, a larger range of control being possible in this case, particularly at the low intensity end of the range. The fact that the deviated light proceeds from either side of a bar is a disadvantage, however, since the resulting area of controlled light in the plane of the bar, being separated by the bar into two portions, is too large for many purposes. This is particularly so when the light modulator is used in a television receiver employing rotating scanning devices, since the high speed scanning device must be placed near to the bar. Consequently in order that this device should be as small as possible it is highly desirable that the area of the controlled light in the plane of the bar should be as small as possible. It is, of course, possible to avoid this disadvantage by using only the light passing one side of the bar, but a 50% loss in the controlled light then occurs.

It is an object of the present invention to overcome this disadvantage, and at the same time to avoid any light loss.

According to the invention there is provided a supersonic wave light modulating device comprising a light source, a supersonic wave cell, an opaque bar between said source and said cell, an apertured screen between said cell and a utilisation point, and an optical system for imaging the plane of said bar on the plane of said screen so that the image of said bar obscures the aperture in said screen.

Thus in the absence of waves in the medium of the cell, no light will pass the aperture. When waves are present each portion of the light passing the bar will be deviated to produce in the plane of the screen its own set of fringes. The aperture selects approximately one half of each set, the other halves being intercepted by the screen. Hence the total amount of controlled light passing through the slit is the same as in the previously described arrangement, but instead of being separated into two parts by an opaque bar, it is concentrated into a single aperture.

The invention will now be described by way of example with reference to the accompanying drawing which shows schematically a preferred form of the invention.

Light rays from the source 1 pass on either side of an opaque bar 2 to illuminate the supersonic wave cell 3. The lenses 4 form an image of the plane 5 containing the bar, on the plane 7, which contains a screen 8 provided with an aperture 9. This image will contain a dark area, corresponding to the bar, and matters are so arranged that this dark area coincides with, or slightly overlaps the aperture 9, so that normally no light will pass the aperture 9. The direct rays which forms this image are indicated at 10.

The source 11 of electrical oscillations which are to control the intensity of the light, is connected to an oscillator-modulator 12, the output of which is applied to the electrodes of a piezo-electric crystal 13 in contact with the liquid in the cell 3. As a result a train of waves of supersonic frequency, modulated in amplitude in accordance with the amplitude of the control oscillations will travel through the liquid in the direction of the arrow.

The light proceeding from either side of the bar 2 will be deviated from either side of its mean position 10, the deviated rays being indicated by the numerals 14, 15, two sets of fringes being produced in the plane 7. The aperture 9 selects one half of each set, namely those corresponding to the deviated rays 14 shown in the drawing. This selected light constitutes the controlled light beam, and passes through the aperture 9 to a utilisation point.

We claim as our invention:

A supersonic wave light modulating device comprising a light source, a supersonic wave cell, an opaque bar between said source and said cell, an apertured screen between said cell and a utilisation point, and an optical system for imaging the plane of said bar on the plane of said screen so that the image of said bar obscures the aperture 5 in said screen.

GUSTAV WIKKENHAUSER.
JOSHUA SIEGER.